(No Model.)
E. F. LINDSEY.
COUNTERBORING ATTACHMENT FOR BITS.
No. 333,418. Patented Dec. 29, 1885.
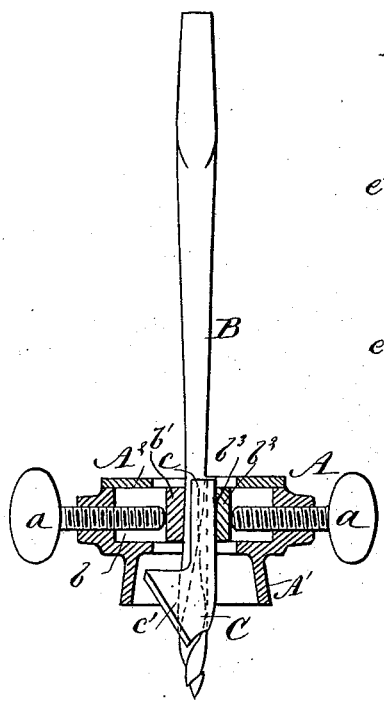
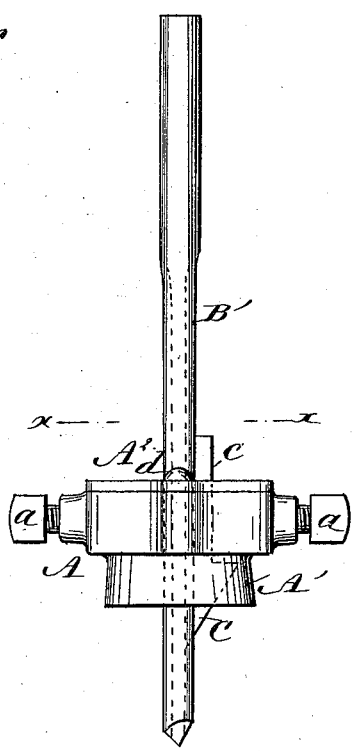
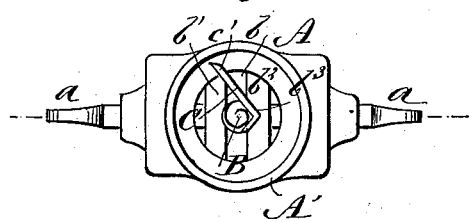
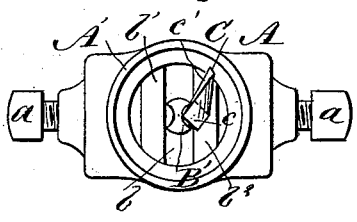
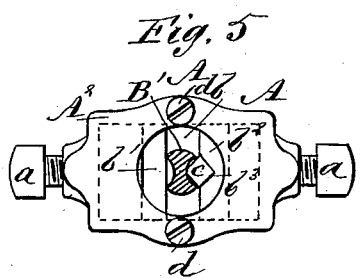
WITNESSES:
C. Neveux
Jas. M. Henley
INVENTOR:
E. F. Lindsey
BY Munn & Co
ATTORNEYS.

UNITED STATES PATENT OFFICE.

EDWIN FRANCIS LINDSEY, OF BRISTOL, RHODE ISLAND.

COUNTERBORING ATTACHMENT FOR BITS.

SPECIFICATION forming part of Letters Patent No. 333,418, dated December 29, 1885.

Application filed May 11, 1885. Serial No. 165,123. (No model.)

*To all whom it may concern:*

Be it known that I, EDWIN F. LINDSEY, of Bristol, in the county of Bristol and State of Rhode Island, have invented a new and Improved Counterboring Attachment for Bits and Drills, of which the following is a full, clear, and exact description.

My invention seeks to provide a practical attachment for any form of bit or drill, for holding adjustably a counterboring or countersinking tool, so that a hole may be bored or drilled and countersunk or counterbored at the same time without removing the bit or drill from the hole.

The invention consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a sectional elevation of my invention applied to a bit and holding a countersinking-tool, the bit and countersinking-tool being shown in elevation. Fig. 2 is a bottom view of the same. Fig. 3 shows my invention applied to a drill for drilling and countersinking metal. Fig. 4 is a bottom view of the same. Fig. 5 is a sectional plan view of the same, taken on the line $x\ x$ of Fig. 3; and Fig. 6 is a front elevation of a counterboring-tool.

A represents the frame, which may be secured to a bit, B, (or drill B',) by the set-screws $a\ a$.

In the cavity $b$ of the frame A is placed the loose sliding jaws $b'\ b^2$, for the ends of the screws $a\ a$ to work against, and to clamp the bit or drill, and also the countersinking-tool C.

The jaw $b'$ is a plain block of metal that is flat on both sides, while the jaw $b^2$ is flat on its outer surface, and notched at $b^3$ on its inner surface in the center of the jaw, to receive the shank $c$ of the countersinking-tool C.

Upon the lower surface of the frame A is formed the stop-flange A', which, together with the diagonal cutting-edge $c'$ of the countersinking-tool, serves to get rid of the chips.

The frame A may be applied to any bit or metal-drill, and it may be adjusted up and down thereto for any depth of hole desired to be bored, and any desired depth of countersink, and the frame also serves as a stop to the bit or drill, so that by properly setting it upon the same a hole of just the required depth may be bored or drilled with accuracy.

Upon the upper surface of the frame A is secured by screws $d\ d$ the top plate, A², which may be removed for inserting and adjusting or repairing the blocks $b\ b'$, in case they should get out of order.

D is the counterboring-tool, formed with point $e$ and cutting-edge $e'$, and it is notched or grooved at $e^2\ e^3$, to receive a corner of the bit with which it is used, so that it will be firmly held against the bit with which it is used by the jaw. The tool D is flat on one surface, and when placed in the frame A for use it will be placed between the bit and the plain jaw $b$, so that a plain surface of the jaw will come against a plain surface of tool D and hold it from turning.

Having thus described my invention, I claim as new and desire to secure by Letters Patent—

1. The combination, with the frame A, having a cavity, $b$, in the center thereof, of loose sliding jaws arranged in said cavity, and set-screws passing through the periphery of the frame and engaging the said jaws, substantially as herein shown and described.

2. The combination, with the frame A, having the cavity $b$ passing through the center thereof, of the loose sliding jaws $b'\ b^2$, arranged in the said cavity, the jaw $b^2$ being provided with the notch $b^3$ on its inner surface, and the set-screws $a$, passing through the periphery of said frame and engaging the said jaws, substantially as herein shown and described.

3. The frame A, having the annular flange A' on its lower surface, and provided with the sliding jaws $b'\ b^2$, working in a central cavity of the frame, and the set-screws $a$, for operating the said jaws through the periphery thereof, as set forth.

EDWIN FRANCIS LINDSEY.

Witnesses:
CHARLES F. SIMMONS,
LEONARD G. SIMMONS.